US006266767B1

(12) United States Patent
Feiste et al.

(10) Patent No.: US 6,266,767 B1
(45) Date of Patent: Jul. 24, 2001

(54) APPARATUS AND METHOD FOR FACILITATING OUT-OF-ORDER EXECUTION OF LOAD INSTRUCTIONS

(75) Inventors: Kurt Alan Feiste; John Stephen Muhich; Steven Wayne White, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/296,871

(22) Filed: Apr. 22, 1999

(51) Int. Cl.[7] ............................. G06F 9/312; G06F 9/445
(52) U.S. Cl. .................. 712/217; 712/220; 712/245; 712/248; 710/54; 711/125; 711/135
(58) Field of Search ........................ 712/223.41, 217.01, 712/219, 218, 21, 22, 216, 23, 228, 206, 245, 248.22; 714/39; 411/125, 135, 156, 183, 213, 214, 159; 710/54, 55

(56) References Cited

U.S. PATENT DOCUMENTS 5,721,855 * 2/1998 Hinton et al. ..................... 712/218
5,751,983    5/1998 Abramson et al. ................ 712/216
5,867,644 * 2/1999 Ranson et al. ...................... 714/39
6,070,238 * 5/2000 Feiste et al. ....................... 712/217

* cited by examiner

Primary Examiner—Daniel H. Pan
(74) Attorney, Agent, or Firm—Anthony V. S. England; Russell D. Culbertson; Shaffer & Culbertson, LLP

(57) ABSTRACT

A processor (100) includes a preload queue (160) for storing a plurality of preload entries. Each preload entry is associated with a preload instruction and includes the address and byte count defined by the respective preload and an identifier associated with the respective preload. A comparison unit (170) associated with the preload queue (160) identifies each conflicting preload entry, that is, each preload entry associated with a preload instruction that conflicts with an older store instruction. The oldest preload instruction associated with one of the conflicting preload entries represents a target preload. The processor (100) may flush this target preload along with all instructions executed after the target preload in order to correct for the conflict between the target preload and store instruction.

20 Claims, 4 Drawing Sheets

APPARATUS AND METHOD FOR FACILITATING OUT-OF-ORDER EXECUTION OF LOAD INSTRUCTIONS

TECHNICAL FIELD OF THE INVENTION

The invention relates to computer processors and, more particularly, to a queue arrangement for storing information to facilitate out-of-order execution of load instructions.

BACKGROUND OF THE INVENTION

Processors used in computers and other devices execute instructions to perform logical operations, load and store operations, and other operations. Processor performance may be increased by providing several execution units which may execute instructions simultaneously. Processors which include multiple, concurrently operating execution units are referred to as superscalar processors.

Instructions to be executed by a processor are written in a certain order referred to as program order. For example, two different load instructions may load data into two different register locations in a processor, and then the next instruction in program order may perform an operation using the data in these two locations and write the result of the operation to another register location. Finally, a store instruction may store the results from the operation to a location in main memory associated with the processor. The first instructions in program order may be thought of as older than the later instructions in program order. In the example above, the initial load instructions are considered older than the store instruction and, conversely, the store instruction is considered to be younger than the load instructions.

A superscalar processor may increase overall processing speed by executing instructions out of program order. For example, a load instruction may be executed ahead of a store instruction in program order. That is, a younger load instruction may be executed ahead of an older store instruction. A load instruction executed ahead of a store instruction in program order is referred to as a preload.

Problems arise in executing instructions out of program order when one instruction depends upon data supplied by another instruction. For example, a store instruction may store data to an address in memory and a load instruction later in program order may load data from that address. In this example, if the load instruction is executed as a preload ahead of the store instruction, it will load incorrect data, causing an error in program execution. Because the preload instruction specifies the same address as the older store instruction, the preload conflicts with the later executed store instruction.

SUMMARY OF THE INVENTION

It is an object of the invention to provide an apparatus and method for detecting a conflict between preload and store instructions, and for enabling the processor to take corrective action to prevent an error from occurring due to the conflict. By detecting store/preload conflicts, the apparatus and method according to the invention help facilitate the out-of-order execution of load instructions in the processor.

An apparatus according to the invention includes a preload queue including a plurality of queue locations for storing a plurality of preload entries. Each preload entry includes an identifier for a preload instruction and further includes address information defined by the respective preload instruction. The identifier includes means for identifying the instruction associated with the preload entry and means for indicating the relative age of the instruction.

As store instructions are executed, a comparison unit associated with the preload queue uses information in each preload entry and information regarding the store instruction being executed to identify each conflicting preload entry. A conflicting preload entry is an entry which defines an address which matches, that is, overlaps, the address of the store instruction being executed, and is associated with a preload instruction which is younger than the store instruction. Thus, the preload queue and comparison unit cooperate to detect preload instructions which have executed despite being dependent on an older store instruction, and therefore, have executed improperly.

The apparatus according to the invention also includes a flush signal arrangement for producing a flush signal. This flush signal identifies a target preload which comprises the oldest improperly executed, or conflicting, preload. The flush signal allows the processor to take corrective action to avoid the error which would otherwise occur due to the conflict between the store and preload instructions. As used in this disclosure and the following claims the target preload is defined as the oldest preload associated with a conflicting preload entry which has been identified by the comparison unit.

The corrective action which the processor takes in response to the flush signal and the apparatus for taking the corrective action are not part of the present invention, and are therefore not discussed in detail in this disclosure. Those skilled in the art will appreciate that the corrective action may commonly involve flushing the target preload and all instructions which have been fully executed after the target preload, and then restoring the state of the processor to the state immediately before the target preload was executed. The target preload and other instructions which have been flushed are then re-fetched and executed. Any flushing, restoring, and re-fetching arrangement may be employed with the preload queue arrangement according to the invention.

According to the invention, a preload identifying arrangement and preload queue routing arrangement assist in loading the preload queue with the required preload entries. The preload identifying arrangement is associated with each execution unit in the processor which executes load instructions, and includes logic for identifying each load instruction which represents a preload. The preload queue routing arrangement is also associated with each execution unit which executes load instructions, and serves to transfer the address information defined by each respective preload to the preload queue along with the identifier associated with the respective preload.

In the preferred form of the invention, the comparison unit comprises an address comparator and an identifier comparator for each queue location. Each address comparator compares the address information of a store instruction being executed with the address information included in the preload entry stored in the respective queue location to determine whether there is a match between the addresses. Each identifier comparator compares the identifier of the store instruction being executed with the identifier included in the preload entry stored in the respective queue location. This comparison determines the relative age between the preload associated with the respective preload entry and the store instruction being executed. Conflict control logic included in a controller associated with the comparison unit receives the address and identifier comparator outputs. When the address and identifier comparator outputs indicate an address match between a preload and an older store instruction being executed, the conflict control logic directs the flush signal arrangement to produce the flush signal.

As used in this disclosure and the following claims, a "match" between the addresses means that the memory locations defined by the addresses and the respective data at least partially overlap. Thus, the address information required by each address comparator includes the actual address specified by the respective instruction and the byte count. This information together defines the memory location implicated by the respective instruction.

Any number of address comparator arrangements may be employed in the preload queue arrangement within the scope of the invention. For example, U.S. patent application Ser. No. 08/927,889, filed Sep. 11, 1997, and entitled "Method and Apparatus for Detecting an Overlap Condition Between a Storage Reference Instruction and a Previously Executed Storage Reference Instruction," now U.S. Pat. No. 6,070,238, discloses a preferred address comparator arrangement for use with the present preload queue invention. The disclosure of application Ser. No. 08/927,889, is hereby incorporated herein by this reference.

The preload queue apparatus according to the invention also preferably includes a preload entry canceling arrangement for canceling preload entries once one or more conflicting preload entries are identified. This canceling action is in addition to corrective action taken by the processor in response to the flush signal. The preload entry canceling arrangement cancels both the preload entry associated with the target preload and each preload entry associated with a preload which is the same age or is younger than the target preload. Also, the preload canceling arrangement may be used to cancel preload entries for reasons not related to preload conflicts.

In the preferred form of the invention, the preload entry canceling arrangement includes a cancel comparator for each queue location. Each cancel comparator compares the identifier of the target preload with the identifier included in the preload entry associated with the respective queue location. The output of each cancel comparator indicates whether the identifier in the respective preload entry identifies a preload which is the same age as, or younger than, the target preload. Cancel control logic included in the queue controller receives the output of each cancel comparator invalidates the preload entry associated with the target preload and each preload entry associated with a preload which is as young as, or is younger, than the target preload. "Invalidate" in this sense means that the respective queue locations are marked as being available for storing a new preload entry, or are erased, or both.

One advantage of the present preload queue apparatus is that the queue may be relatively small since preload queue locations are not allocated until a preload is executed (versus upon dispatch). Also, the preload queue may be analyzed to see if any of the preload entries are associated with preloads which are now older, in terms of program order, than the oldest unexecuted store instruction. If a preload entry is associated with such an older preload, there is no chance of a conflict between that preload and a store instruction. Thus, the preload entry associated with the preload may be removed or invalidated to make room for an entry associated with the next preload to execute. Delayed allocation and early removal of preload queue entries reduce the number of entries in the queue. The reduced number of queue entries, in turn, simplifies the control logic and reduces the possibility that associated timing effects will affect system clock rates.

To facilitate the early removal of preload queue entries, the invention includes a store tracking unit, preferably associated with the processor's dispatch unit, which identifies the oldest unexecuted store instruction and transmits the identifier associated with that instruction for use by a removal comparator arrangement. The removal comparator arrangement includes a removal comparator for each queue location. Each removal comparator compares the identifier of the oldest unexecuted store instruction to the identifier included in the preload entry stored in the respective queue location. If the identifier comparison performed by a removal comparator indicates that the preload associated with the preload entry is older than the oldest unexecuted store instruction, removal control logic which may be included in the queue controller invalidates the respective preload entry.

The preferred preload queue arrangement also includes logic to ensure room in the preload queue for the next preload to be executed. Specifically, for the case in which logically younger loads have filled the preload queue, a flush mechanism is provided to force room in the preload queue for a currently executing, but older, load instruction.

It is also advantageous to keep track of the relative age of each preload being executed and each preload for which a preload entry is stored in the preload queue. Therefore, the apparatus according to the invention preferably includes an ordering arrangement including at least one ordering comparator for each queue location. Where the processor includes multiple execution units which may concurrently execute load instructions, the ordering comparator arrangement includes for each such execution unit an ordering comparator for each queue location, and also "at-execute" comparators for comparing preloads being executed simultaneously. The comparators included in the ordering arrangement compare the identifiers of each preload instruction being executed with the identifiers stored in each preload entry. Ordering logic which may be included in the queue controller receives the results from these comparators and, based on the comparator results, assigns a relative order to the preload entries in terms of age. The relative order is preferably maintained in memory associated with the queue controller and is used when multiple preloads conflict with a store instruction being executed.

These and other objects, advantages, and features of the invention will be apparent from the following description of the preferred embodiments, considered along with the accompanying drawings.

DESCRIPTION OF THE PREFERRED EMBODIMENTS

Figure 1:
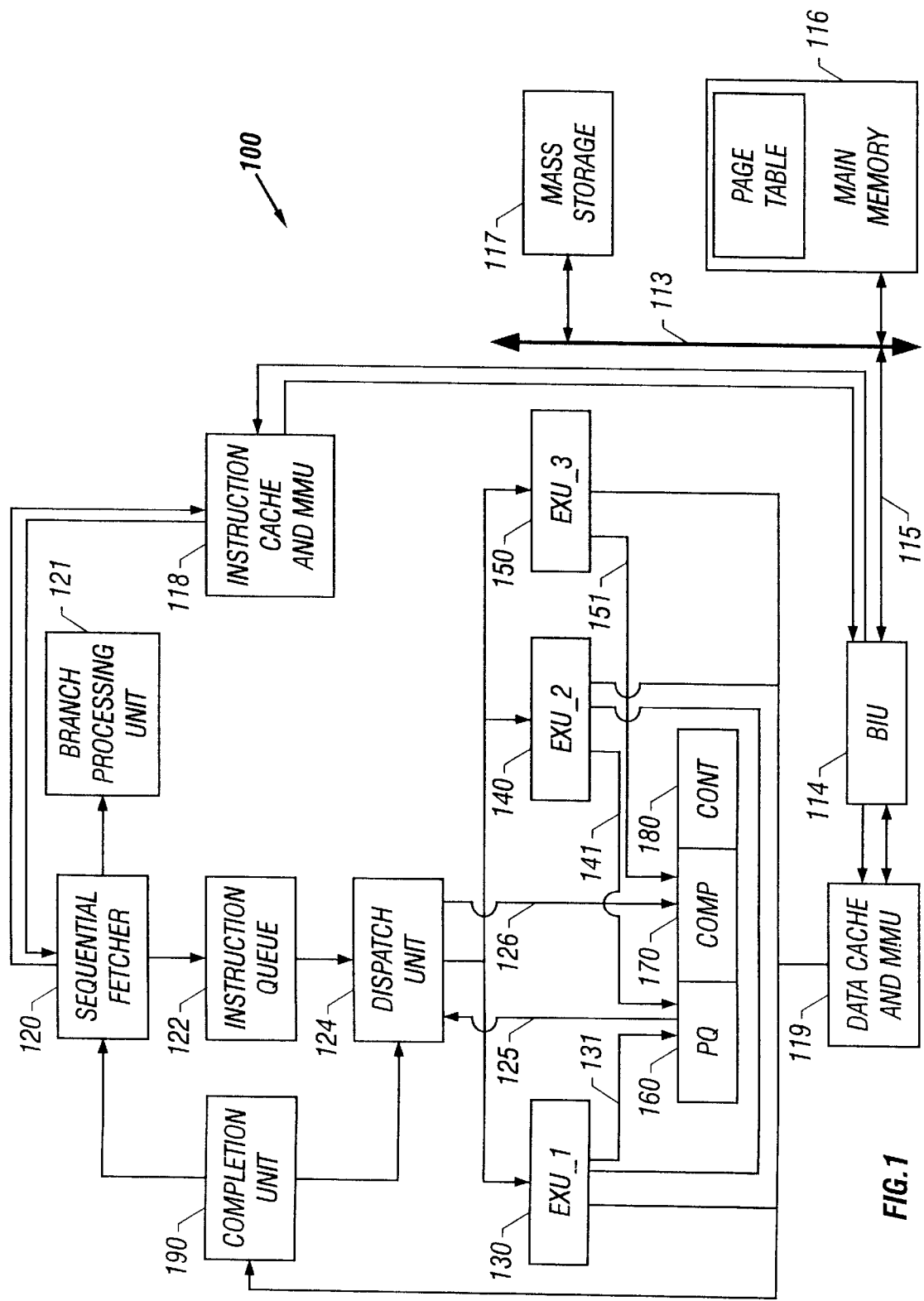
FIG. 1 is a diagrammatic representation of a processor embodying the principles of the invention.

FIG. 1 illustrates a processor 100 embodying the principles of the invention. Processor 100 includes a preload queue 160 which will be described in detail below with reference to FIGS. 2 and 3. Preload queue 160 and an associated comparison unit 170 and queue controller 180 cooperate to detect conflicts between preload instructions and store instructions, and to signal the processor to correct for such conflicts. Thus, preload queue 160, comparison unit 170, and the associated controller 180 operate together to facilitate the out-of-order execution of load instructions.

In the illustrative embodiment shown in FIG. 1, processor 100 comprises a single integrated circuit superscalar microprocessor. Accordingly, processor 100 includes various execution units, registers, buffers, memory devices, and other functional units, which are all formed by integrated circuitry. Of course, although the invention is described herein as applied to a microprocessor, the present preload queue arrangement is not limited to microprocessors and may be implemented in other types of processors. Also, the general processor arrangement shown in FIG. 1 is shown only for purposes of example in explaining the operation of preload queue 160, comparison unit 170, and controller 180. Those skilled in the art will appreciate that the preload queue described and claimed in this document may be utilized in substantially any processor arrangement including an instruction flushing system.

As illustrated in FIG. 1, processor 100 is coupled to system bus 113 via bus interface unit (BIU) 114 and processor bus 115. Both system bus 113 and processor bus 115 include address, data, and control buses which are not shown separately. BIU 114 participates in bus arbitration to control the transfer of information between processor 100 and other devices coupled to system bus 113, such as main memory 116 and non-volatile mass storage 117. The data processing system illustrated in FIG. 1 preferably includes other devices coupled to system bus 113; however, these other devices are not necessary for an understanding of the invention and are accordingly omitted from the drawings so as not to obscure the invention in unnecessary detail.

BIU 114 is connected to instruction cache and MMU (memory management unit) 118 and data cache and MMU 119. High-speed caches, such as those within instruction cache and MMU 118 and data cache and MMU 119, enable processor 100 to achieve relatively fast access times to a subset of data or instructions previously transferred from main memory 116 to the caches, thus improving the overall processing speed. Data and instructions stored within the data cache 119 and instruction cache 118, respectively, are each identified and accessed by an effective address, which is related to the real address of the respective data or instruction in main memory 116.

Instruction cache and MMU 118 is further coupled to sequential fetcher 120, which fetches instructions for execution from instruction cache and MMU 118 during each processor cycle. Sequential fetcher 120 transmits branch instructions fetched from instruction cache and MMU 118 to branch processing unit (BPU) 121 for execution, and temporarily stores sequential instructions within instruction queue 122 for eventual transfer to dispatch unit 124 for decoding and dispatch to execution units 130, 140, or 150.

In the illustrated embodiment, in addition to BPU 121, the execution circuitry of processor 100 comprises the three separate execution units 130, 140, and 150 for executing sequential instructions. Both the first execution unit (EXU_1) 130 and second execution unit (EXU_2) 140 in this example processor may be adapted to perform fixed-point mathematical and logical operations as well as load operations which load data from memory. The third execution unit (EXU_3) 150 in processor 100 may be adapted to perform complex fixed point operations. Third execution unit 150 may also perform store operations which store data to memory. Those skilled in the art will appreciate that various general purpose and floating point registers are associated with the execution units 130, 140, and 150 for temporarily storing operands and operation results. These registers are not shown in FIG. 1 since an understanding of their operation is not necessary for an understanding of the present preload queue arrangement.

The three execution units 130, 140, and 150 are shown in FIG. 1 only for purposes of example. The preload queue arrangement described herein is not limited to this particular execution unit arrangement or any other execution unit arrangement. For example, the invention may be employed in a processor which includes a fixed point execution unit, a floating point execution unit, and a load/store unit. This and other execution unit arrangements are to be considered equivalent to the system set out in this disclosure.

Processor 100 employs both pipeline and out-of-order execution of instructions to further improve the performance of its superscalar architecture. As is typical of high-performance processors, each sequential instruction is processed in distinct pipeline stages, namely, fetch, decode/dispatch, issue, execute, finish, and completion. Instructions can be executed by EXU_1 130 and EXU_2 140 in any order as long as data dependencies are observed. In this example, store and store-type instructions are executed by EXU_3 in program order. Store-type instructions include store instructions and cache operator-type instructions which change the state of storage, such as flushing or invalidating the cache. Such store-type instructions are referred to in this disclosure and the following claims simply as store instructions or stores. Within individual execution units, 130, 140, and 150, instructions are also processed in a sequence of pipeline stages unique to the particular execution unit.

During the fetch stage, sequential fetcher 120 retrieves one or more instructions associated with one or more memory addresses from instruction cache and MMU 118. Sequential fetcher 120 stores sequential instructions fetched from instruction cache and MMU 118 within instruction queue 122. Branch instructions are removed or folded out by sequential fetcher 120 to BPU 121 for execution. BPU 121 includes a branch prediction mechanism (not shown separately) which, in one embodiment, comprises a dynamic prediction mechanism such as a branch history table. This branch history table enables BPU 121 to speculatively execute unresolved conditional branch instructions by predicting whether or not the branch will be taken.

During the decode/dispatch stage, dispatch unit 124 decodes and dispatches one or more instructions from instruction queue 122 to the execution units 130, 140, and 150. In the preferred form of the invention, dispatch unit 124 preferably includes a store tracking arrangement for identifying the oldest unexecuted store instruction. For example, dispatch unit 124 preferably includes a dispatch queue (not shown) for instructions waiting to be dispatched to one of the execution units. Predecode bits associated with each store instruction identify the store instructions. The oldest instruction which has the predecode bit set represents the oldest store instruction yet to be dispatched. As will be discussed with particular reference to FIGS. 2 and 3 below, and as indicated by lines 125 and 126 in FIG. 1, dispatch unit 124 also receives a flush signal from a flush signal arrangement associated with preload queue 160 and transmits information to comparison unit 170. This information transmitted from dispatch unit 124 may comprise both an identifier identifying the age of the oldest unexecuted store instruction and an identifier identifying a preload entry to be canceled.

During the execution stage, execution units 130, 140, and 150 execute instructions issued from dispatch unit 124. Also, each execution unit which executes load instructions (units 130 and 140 in the illustrated case) includes a preload identifying arrangement for identifying each load instruction which represents a preload, that is, each load instruction which has been executed ahead of a store instruction in program order. As will be discussed below with reference to FIGS. 2 and 3, the preload queue routing arrangements associated with execution units 130 and 140 transfer address and identifying information regarding preload instructions to preload queue 160 as indicated by lines 131 and 141 in FIG. 1. Also, as indicated by line 151, execution unit 150 transmits to comparison unit 170 address and identifying information regarding each store instruction being executed. Once the issued instructions are fully executed, execution units 130, 140, and 150 store the results, if any, within the associated general purpose or other registers and also notify completion unit 190 that the instructions have finished execution. Finally, instructions are completed in program order out of a completion buffer (not shown separately) associated with the completion unit 190.

Figure 2:
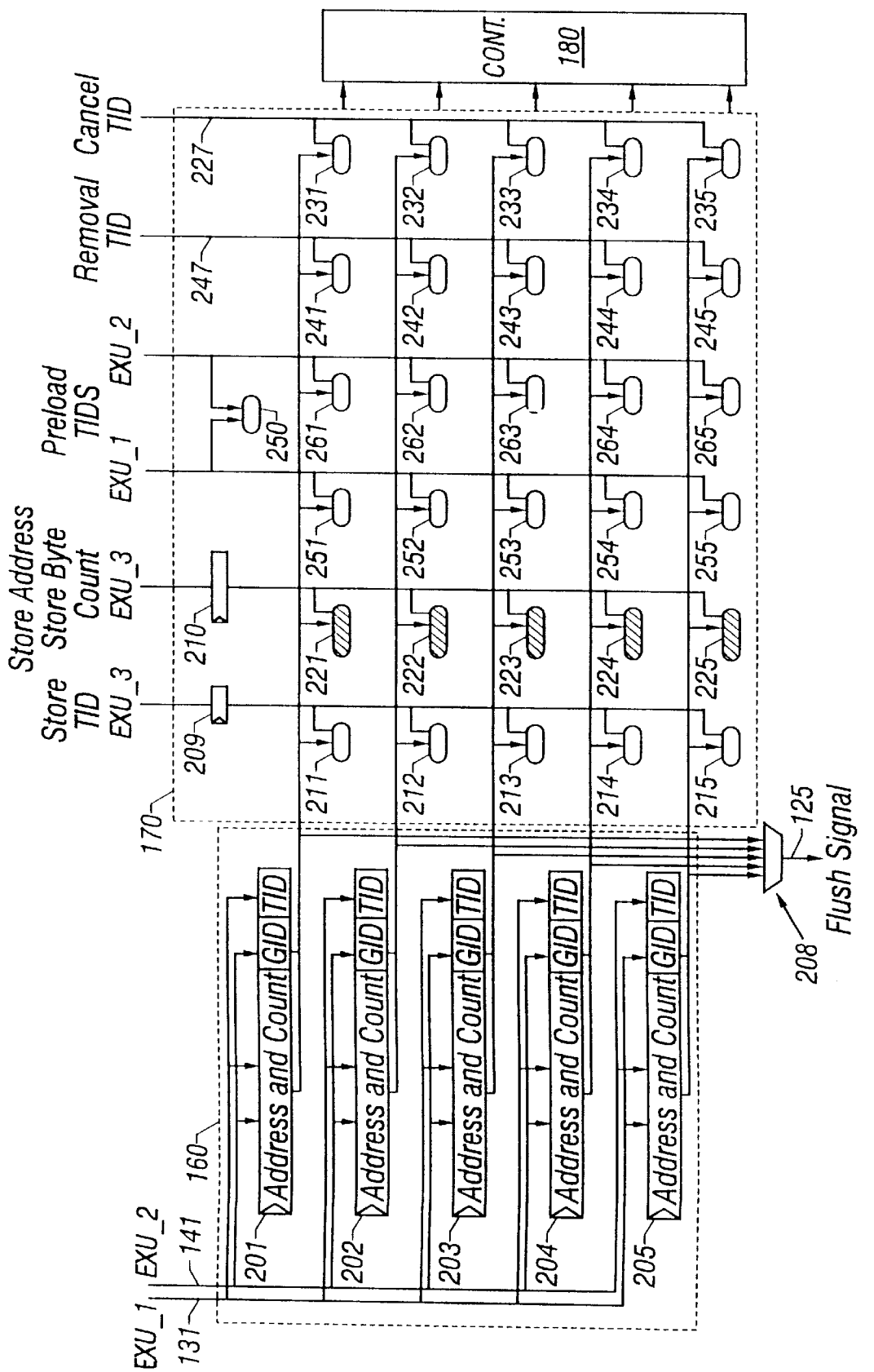
FIG. 2 is a diagrammatic representation of the preload queue, comparison unit, and queue controller shown in FIG. 1.

Referring to FIG. 2, preload queue 160 includes a plurality of registers or latches 201, 202, 203, 204, and 205. Although five separate registers are shown in FIG. 2 for purposes of illustrating the invention, preload queue 160 may include more or fewer registers within the scope of the invention. Each register comprises a queue location and is adapted to store a preload entry associated with a preload instruction which has been executed.

Each preload entry includes address information defined by the preload instruction, and also includes an identifier for the preload instruction. The address information includes the translated real address itself and the byte count for the data stored at the memory address. Thus, the address information included in each preload entry identifies the entire memory location implicated by the respective preload instruction. In the illustrated form of the invention, the identifier includes a TID or tag ID and a GID or Group ID. The TID comprises a sequential identifier which is assigned to each instruction as the instruction is fetched in program order by sequential fetcher 120. Thus, the TID not only identifies a particular instruction but also provides an indication of the relative age of the instruction in terms of program order. The GID includes additional information regarding the preload instruction which may be required for restoring a previous condition of processor 100.

As used in this disclosure and following claims, the term "identifier" is used to describe the information required to be included in each preload entry other than the address and related information used to determine an address match as defined in this disclosure. The identifier serves two functions. First, the identifier identifies a particular preload instruction. Second, the identifier indicates the relative age of the identified instruction in terms of program order. Although the TID which is described in the illustrated form of the invention performs both functions of the identifier, it will be appreciated that the functions may be performed by two different elements which are included in each preload entry. These multiple element identifiers are to be considered equivalent to the single element identifier (TID) described herein and used in the following claims.

Each register 201, 202, 203, 204, and 205 of preload queue 160 is connected to receive the address and byte count along with an identifier from first execution unit 130 (FIG. 1) through a transmission line 131 shown in both FIG. 1 and FIG. 2. Similarly, each register 201, 202, 203, 204, and 205 in preload queue 160 is connected to receive an address, byte count, and identifier from execution unit 140 through transmission line 141 shown in FIGS. 1 and 2. It will be appreciated that although two execution units (130 and 140) are shown in processor 100 for executing load instructions, more or fewer execution units may be included a processor for executing load instructions. Regardless of the number of load execution units, each such execution unit includes a suitable connection such as those represented by lines 131 and 141 for transferring address information and an identifier to preload queue 160.

Referring still to FIG. 2, a flush signal arrangement shown generally at reference number 208 is associated with preload queue 160. In the event that a preload instruction associated with a preload entry is found to conflict with a store instruction being executed, flush signal arrangement 208 provides a flush signal which identifies the target preload. The target preload is described further below in reference to comparison unit 170. The flush signal is directed to the unit included in the processor which is adapted to initiate a processor flushing operation throughout processor 100. In the illustrated form of the invention, dispatch unit 124 receives the flush signal through line 125 and, in response to the flush signal, initiates a processor flushing operation. This flushing operation is performed by suitable flushing and restore systems included in processor 100.

Comparison unit 170 includes a latch 209 or other suitable storage device for storing the identifier associated with a store instruction being executed and also a latch 210 for storing the translated address information defined by the store instruction currently being executed by third execution unit 150. In this form of the invention the identifier includes the TID of the store instruction, and the address information includes the memory address translated by execution unit 150 along with the byte count for the data associated with the address. Comparison unit 170 receives both the store TID and store address information from execution unit 150 through an appropriate transmission arrangement shown in FIG. 1 as line 151.

Comparison unit 170 also includes a series of identifier comparators 211, 212, 213, 214, and 215, and to a series of address comparators 221, 222, 223, 224, and 225. One identifier comparator and one address comparator is included in comparison unit 170 for each register of preload queue 160, that is, each queue location. Also, each identifier comparator and each address comparator is connected to receive the identifier (TID) and address/byte count, respectively, from a different one of the registers 201, 202, 203, 204, and 205. The comparison performed by each identifier comparator 211, 212, 213, 214, and 215 indicates whether the store instruction is older or younger than the preload instruction associated with the preload entry stored in the respective queue location. The comparison performed by address comparators 221, 222, 223, 224, and 225, between the store address information latched at 210 and preload address information stored in the respective register 201, 202, 203, 204, and 205 indicates whether there is a memory location overlap or match between the store address and an address defined by a preload instruction.

The results of identifier comparators 211, 212, 213, 214, and 215, and address comparators 221, 222, 223, 224, and 225 are directed to controller 180. Cancel control logic associated with controller 180 uses the comparator results in any suitable logic operation to identify each conflicting preload entry. A preload entry is identified as a conflicting preload entry if the store instruction is older than instruction represented by the preload entry and if there is a match or overlap between the memory locations defined by the store instruction address information and the preload instruction address information. That is, by executing out of order with respect to the store instruction, the preload instruction has loaded data which would have been changed had the store instruction been executed first. Thus, the respective preload instruction associated with a conflicting preload entry has executed improperly. The instruction must be flushed by a suitable flushing mechanism included in processor 100 along with each instruction executed after the improperly executed preload instruction and must be re-fetched and re-executed.

To facilitate the corrective action, the cancel control logic of controller 180 prompts flush signal arrangement 208 to produce a flush signal back to dispatch unit 124 through line 125. The flush signal includes the identifier of the target preload, that is, the oldest preload instruction which is represented by a conflicting preload entry in preload queue 160. Dispatch unit 124 uses this identifier to initiate a flushing operation and also preferably to issue a cancel signal back to comparison unit 170 for use in canceling the preload entry representing or associated with the target instruction and preload entries represented by preload instructions younger than the target preload.

As shown in FIG. 2, the preload entry canceling arrangement included in the illustrated comparison unit 170 includes cancel comparators 231, 232, 233, 234, and 235. The canceling arrangement receives the cancel signal from dispatch unit 124 (FIG. 1) on line 227 in the form of the TID of the target preload. Each cancel comparator 231, 232, 233, 234, and 235 compares the identifier (TID) of the target preload with the identifier (TID) stored in the respective queue location (register 201, 202, 203, 204, or 205). The output of each cancel comparator 231, 232, 233, 234, and 235 is directed to cancel control logic included in controller 180. If the respective comparison indicates that the cancel signal (target preload TID) is for an instruction as old or older than the instruction represented by the preload entry stored in the respective queue location, the cancel control logic invalidates the respective preload entry, leaving each respective queue location available for receiving a new preload entry. The valid/invalid status of a preload entry and thus the availability of a queue location is preferably maintained at controller 180. For example, controller 180 may have a single bit for each register 201, 202, 203, 204, and 205, which indicates "valid" in one state and "invalid" in the opposite state.

Those skilled in the art will appreciate that the preload queue arrangement according to the invention may be implemented without the cancel comparators shown in FIG. 2. Alternate forms of the invention may identify conflicting preload queue entries for cancellation using identifier comparators 211, 212, 213, 214, and 215.

The illustrated form of the invention also includes a removal arrangement including removal comparators 241, 242, 243, 244, and 245, one comparator for each queue location or register in preload queue 160. The removal arrangement is applicable in processors which execute store instructions in program order, and receives the identifier, in this case the TID, of the oldest unexecuted store instruction. This information in the preferred form of the invention is provided by dispatch unit 124 on line 247. Line 247 is included in the transmission path 124 shown in FIG. 1. Each removal comparator compares the identifier stored in the respective queue location or register (that is, the identifier included in the respective preload entry) with the identifier for the oldest unexecuted store. The result of this comparison indicates if the preload instruction associated with the respective preload entry and queue location is now older than the oldest unexecuted store instruction. Removal logic included in controller 180 receives the results from removal comparators 241, 242, 243, 244, and 245, and if the preload instruction associated with a preload entry is older than the oldest unexecuted store instruction, then the respective preload entry is invalidated. This allows the preload queue location of the invalidated preload entry to be available for receiving a new preload entry.

The illustrated comparison unit 170 also includes an ordering arrangement for determining the relative age of each preload instruction associated with a valid preload entry in queue 160, and of each preload instruction currently being executed by one on the execution units 130 or 140. Ordering logic is included in controller 180 for determining relative age based on comparator results and preferably stores the order of the various preload instructions in memory included in the controller. Controller 180 and the cancel and removal logic included in the controller may use this ordering information in invalidating preload entries. However, the primary use of this ordering information is in identifying the oldest preload when a store matches multiple preloads.

In the illustrated form of invention which includes two separate execution units 130 and 140 which may concurrently execute different load instructions, the ordering arrangement includes an "at-execute" comparator 250 for comparing the identifiers of the two preloads being executed. Additionally, for each execution unit, the ordering arrangement includes an ordering comparator for each register or queue location. As shown in FIG. 2, the ordering comparators for execution unit 130 include comparators 251, 252, 253, 254, and 255. The ordering comparators for execution unit 140 include comparators 261, 262, 263, 264, and 265. The outputs of these ordering comparators are directed to controller 180 which includes ordering logic to assign a relative order to the various preloads in terms of age or program order.

In the preferred form of the invention, controller 180 also includes deadlock logic for obviating deadlock conditions in preload queue 160 which might arise due to interaction of out-of-order load execution and preload queue overflow. If the load currently being executed by unit 130 or 140 is a preload and preload queue 160 is full with all registers 201, 202, 203, 204, and 205 containing a valid entry, the situation maybe resolved in one of two ways. First, if the preload being executed is younger than the preload instructions represented by the preload entries, then the deadlock logic associated with controller 180 causes the preload being executed to be flushed and re-fetched. Alternatively, if the preload queue has an entry which represents a preload younger than the preload being executed, the deadlock logic causes the entry in preload queue 160 which is associated with the younger preload to be canceled and the preload instruction flushed and re-fetched. The queue location or register which held the canceled entry is used to store the address information and identifier for the preload being executed.

Figure 3A:
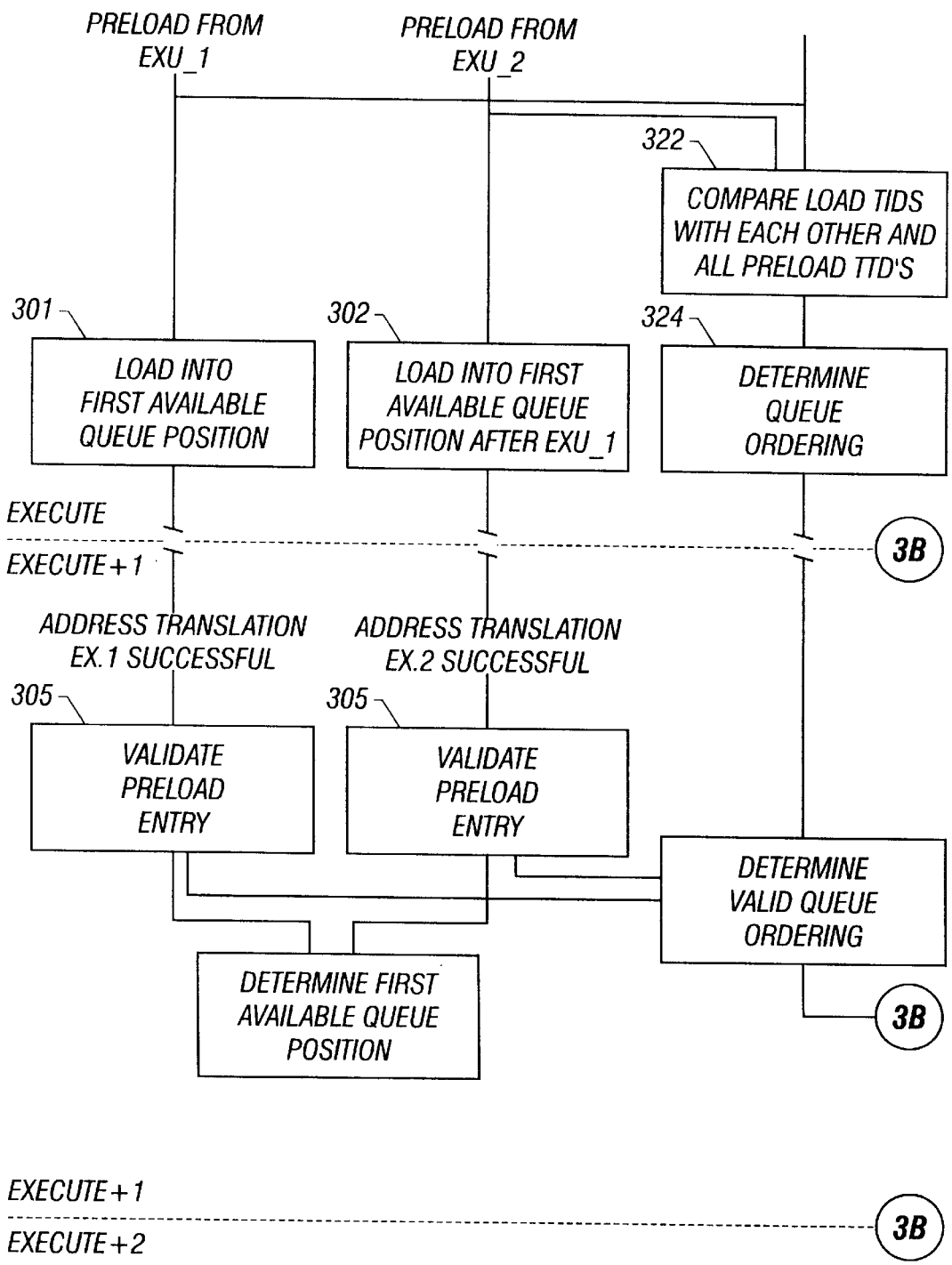
FIGS. 3A and 3B together show a diagram illustrating the method by which the preload queue arrangement shown in FIGS. 1 and 2 operates to avoid conflicts between preload and store instructions.
Figure 3B:
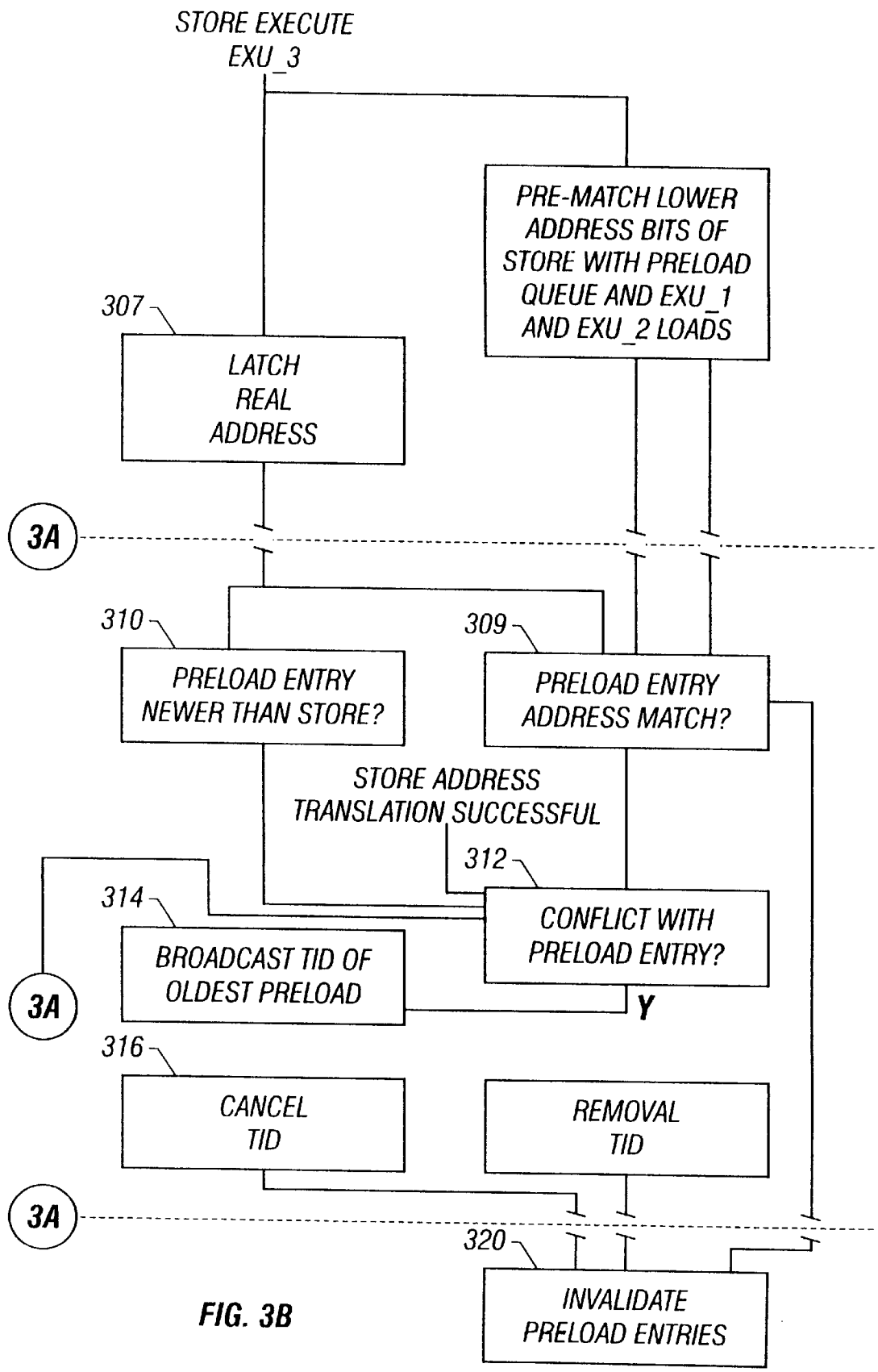

The method of the invention and operation of the apparatus may be described with reference to the apparatus shown in FIG. 2 and the process diagrams of FIGS. 3A and 3B. FIGS. 3A and 3B are each separated into the three sections: "execute," "execute+1," and "execute+2." The "execute" section indicates an execution cycle of processor 100 while the "execute+1" section refers to the immediately following cycle, and "execute+2" refers the next cycle after "execute+1."

Referring to the execute section in FIG. 3A, the method of the invention includes at steps 301 and 302 storing preload entries into preload queue 160 shown in FIGS. 1 and 2. The preload entry information includes the address information defined by the respective preload and an identifier associated with the respective preload. In this form of the invention the information to be loaded includes the TID for the preload and the translated address and byte count for the preload. In the preferred form of the invention the ordering between preload entries is maintained separately from the physical locations of the entries in the registers 201, 202, 203, 204, and 205 (FIG. 2), and thus each preload entry is loaded into the first available queue location, such as the first queue location marked "invalid."

Referring now to cycle "execute+1" in FIG. 3A, once the preload entry information is stored into the respective register or queue location, the respective register is preferably marked as "valid" at process step 305. This step is performed by controller 180 in FIG. 2. The "valid" status indicates that the queue location or register is occupied by a current preload entry.

Referring back to the execute cycle and to block 307 in FIG. 3B, as a store instruction is executed, and more particularly after the store address is translated by execution unit 150 in FIG. 1, the real address and byte count for the store instruction is stored in latch 210 associated with comparison unit 170 (both in FIG. 2). The identifier associated with the store instruction is stored in latch 209 (also FIG. 2).

In the following cycle, "execute+1," the invention includes identifying each conflicting preload entry. This identifying step is performed in the illustrated form of the invention by the address comparators 221 through 225 and identifier comparators 211 through 215 shown in FIG. 2. The outputs of the address comparators are used at block 309 in (FIG. 3B) to indicate which preload entry addresses match or overlap with the address defined by the store instruction in latch 210 (FIG. 2). The outputs of the identifier comparators are used at process block 310 in FIG. 3B to determine which preload entries are associated with a preload instruction which is younger in terms of program order than the store instruction being executed. The comparator results are supplied to controller 180 (FIG. 2). If the cancel control logic associated with controller 180 identifies a conflicting preload at block 312 in FIG. 3B, then at process block 314, the controller causes the flush signal arrangement 208 in FIG. 2 to transmit the flush signal. In the form of the invention shown in FIG. 2, the flush signal is transmitted back to the dispatch unit 124. The flush signal includes the identifier, in this case the TID, of the target preload.

In the illustrated form of the invention, a cancel signal comprising the TID of the target preload is issued at block 316 in FIG. 3B. This cancel signal is directed to cancel comparators 231 through 235 associated with comparison unit 170 in FIG. 2. The cancel comparators then in cycle "execute+2" compare the target preload TID with the identifier included in each preload entry. The preload entry having the matching identifier is the entry for the target preload and is invalidated at block 320 in FIG. 3B along with each preload entry associated with any preload instruction which is the same age or younger than the target preload.

Referring back to the "execute" cycle, the method of the invention also preferably includes determining the relative order (program order) between all preload instructions including instructions which are represented by preload entries in preload queue 160 and any preload instructions currently being executed in that cycle. The comparison is performed at block 322 in FIG. 3A by the comparators 250 through 251 and 261 through 265 shown in FIG. 2. The outputs from these comparators are directed to ordering logic associated with controller 180. At block 324 in FIG. 3A, the ordering logic determines the relative order of the preloads and preferably stores the order in an array associated with controller 180.

The above described preferred embodiments are intended to illustrate the principles of the invention, but not to limit the scope of the invention. Various other embodiments and modifications to these preferred embodiments may be made by those skilled in the art without departing from the scope of the following claims.

What is claimed is:

1. An apparatus for facilitating out-of-order execution of load instructions in a processor, the apparatus comprising:
    (a) a preload identifying arrangement for identifying each load instruction which represents a preload;
    (b) a preload queue having a plurality of queue locations for storing a plurality of preload entries, each preload entry being associated with a preload, being allocated when the respective preload is executed, and including (i) address information defined by the respective preload, and (ii) an identifier associated with the respective preload;
    (c) a preload queue routing arrangement associated with each execution unit in the processor which executes load instructions, the preload queue routing arrangement for transferring the address information defined by each respective preload and the identifier associated with the respective preload to the preload queue;
    (d) a comparison unit for identifying each conflicting preload entry, a conflicting preload entry comprising a preload entry which (i) defines an address which matches the address of a store instruction being executed, and (ii) is associated with a preload which is younger than the store instruction being executed; and
    (e) a flush signal arrangement associated with the preload queue, the flush signal arrangement for providing a flush signal which identifies a target preload, the target preload comprising the oldest preload associated with a conflicting preload entry identified by the comparison unit.

2. The apparatus of claim 1 wherein the comparison unit comprises:
    (a) an address comparator for each queue location, each respective address comparator for comparing the address of the store instruction being executed with the address information included in the preload entry stored in the respective queue location;
    (b) an identifier comparator for each queue location, each respective identifier comparator for comparing an identifier of the store instruction being executed with the identifier included in the preload entry stored in the respective queue location to determine the relative age of the store instruction being executed and the preload associated with the respective preload entry; and
    (c) conflict control logic connected to receive an output from each address comparator and each identifier comparator, and for directing the flush signal arrangement to provide the flush signal.

3. The apparatus of claim 1 further comprising:
    (a) a preload entry canceling arrangement for canceling the preload entry associated with the target preload and each preload entry associated with a preload which is as young or younger than the target preload.

4. The apparatus of claim 3 wherein the preload entry canceling arrangement includes:
   (a) a cancel comparator for each queue location, each respective cancel comparator for comparing the identifier associated with the target preload with the identifier included in the preload entry stored in the respective queue location; and
   (b) cancel control logic connected to receive an output from each cancel comparator and for invalidating the preload entry associated with the target preload and each preload entry associated with a preload which is as young or younger than the target preload.

5. The apparatus of claim 1 further comprising:
   (a) a store tracking unit for determining an oldest unexecuted store instruction and transmitting an identifier associated with the oldest unexecuted store instruction; and
   (b) a removal comparator arrangement for receiving the identifier transmitted by the store tracking unit and removing each preload entry associated with a preload which is older than the oldest unexecuted store instruction.

6. The apparatus of claim 5 wherein the removal comparator arrangement includes:
   (a) a removal comparator for each queue location, each respective removal comparator for comparing the identifier transmitted by the store tracking unit with the identifier included in the preload entry stored in the respective queue location; and
   (b) removal control logic connected to receive an output from each removal comparator and for invalidating each preload entry associated with a preload which is older than the oldest unexecuted store instruction.

7. The apparatus of claim 1 further comprising:
   (a) an ordering arrangement for indicating the relative age of each preload being executed and each preload associated with a preload entry.

8. The apparatus of claim 7 wherein the ordering arrangement includes:
   (a) for each execution unit in the processor capable of executing a load instruction in a given cycle, an ordering comparator for each queue location, each ordering comparator for comparing the identifier associated with the preload being executed by a different one of the execution units with the identifier included in the preload entry stored in the respective queue location;
   (b) an "at-execute" comparator for comparing the identifier associated with each preload being executed; and
   (c) ordering control logic connected to receive an output from each ordering comparator and the "at-execute" comparator and, based on said outputs, for determining the relative age of each preload associated with a preload queue entry and each preload being executed.

9. The apparatus of claim 7 wherein the ordering arrangement includes:
   (a) an ordering comparator for each queue location, each ordering comparator for comparing an identifier associated with a preload being executed with the identifier included in the preload entry stored in the respective queue location; and
   (b) ordering control logic connected to receive an output from each ordering comparator and, based on said outputs, for determining the relative age of the preload being executed and each preload associated with a preload entry.

10. A method for facilitating out-of-order execution of load instructions in a processor, the method comprising the steps of:
    (a) storing a plurality of preload entries, each preload entry being associated with an instruction identified as a preload and being allocated at the time the respective preload is executed, each preload entry including (i) address information defined by the respective preload, and (ii) an identifier associated with the respective preload;
    (b) identifying each conflicting preload entry, a conflicting preload entry comprising a preload entry which (i) defines an address which matches the address of a store instruction being executed, and (ii) is associated with a preload which is younger than the store instruction being executed; and
    (c) producing a flush signal which identifies a target preload, the target preload comprising the oldest preload associated with a conflicting preload entry.

11. The method of claim 10 wherein the step of identifying each conflicting preload entry includes the steps of:
    (a) comparing the address of the store instruction being executed with the address information included in each preload entry; and
    (b) comparing an identifier of the store instruction being executed with the identifier included in each preload entry to determine the relative age of the store instruction being executed and the preload associated with each preload entry.

12. The method of claim 10 further comprising the step of:
    (a) canceling the preload entry associated with the target preload and each preload entry associated with a preload which is as young as or younger than the target preload.

13. The method of claim 12 wherein the step of canceling each preload entries includes the steps of:
    (a) comparing the identifier associated with the target preload with the identifier included in each preload entry; and
    (b) based on the comparison of identifiers, invalidating the preload entry associated with the target preload and each preload entry associated with a preload which is as young as or younger than the target preload.

14. The method of claim 10 further comprising the steps of:
    (a) determining an oldest unexecuted store instruction; and
    (b) removing each preload entry associated with a preload which is older than the oldest unexecuted store instruction.

15. The method of claim 14 wherein the step of removing each preload entry associated with a preload which is older that the oldest unexecuted store instruction includes the steps of:
    (a) comparing the identifier of the oldest unexecuted store instruction with the identifier included in each preload entry; and
    (b) based on said comparison, invalidating each preload queue entry associated with a preload which is older than the oldest unexecuted store instruction.

16. The method of claim 10 further comprising the step of:
    (a) determining the relative age of each preload being executed and each preload associated with a preload entry.

17. The method of claim 16 wherein the step of determining the relative age of each preload being executed and each preload associated with a preload entry includes the steps of:

(a) comparing the identifier associated with each preload being executed with the identifier included in each preload entry;

(b) comparing the identifier associated with each preload being executed with the identifier of each other preload being executed; and (c) wherein the relative age of each preload associated with a preload entry and each preload being executed is determined based on said identifier comparisons.

18. The method of claim 10 further comprising the steps of:

(a) comparing an identifier associated with a preload being executed with the identifier included in each preload entry; and (b) determining the relative age of each preload associated with a preload entry and the preload being executed based on said identifier comparisons.

19. An apparatus for detecting conflicts between instructions identified as preloads and store instructions in a processor adapted to support out-of-order processing of load instructions, the apparatus comprising:

(a) a preload queue having a plurality of queue locations for storing a plurality of preload entries, each preload entry being associated with a preload and including (i) address information defined by the respective preload, and (ii) an identifier associated with the respective preload;

(b) a preload queue routing arrangement for transferring the address information defined by each respective preload and the identifier associated with the respective preload to the preload queue;

(c) a comparison unit for identifying each conflicting preload entry, a conflicting preload entry comprising a preload entry which (i) defines an address which matches the address of a store instruction being executed, and (ii) is associated with a preload which is younger than the store instruction being executed; and (d) a removal comparator arrangement for removing each preload entry associated with a preload which is older than the oldest unexecuted store instruction.

20. The apparatus of claim 19 further comprising:

(a) a store tracking unit for determining an oldest unexecuted store instruction and transmitting an identifier associated with the oldest unexecuted store instruction to the removal comparator arrangement.

* * * * *

UNITED STATES PATENT AND TRADEMARK OFFICE
CERTIFICATE OF CORRECTION

PATENT NO. : 6,266,767 B1
DATED : July 24, 2001
INVENTOR(S) : Feiste et al.

Page 1 of 1

It is certified that error appears in the above-identified patent and that said Letters Patent is hereby corrected as shown below:

Column 14,
Line 53, "that" should read -- than --

Signed and Sealed this

First Day of January, 2002

Attest:

Attesting Officer

JAMES E. ROGAN
Director of the United States Patent and Trademark Office